M. C. FLANNERY.
SANITARY CLOSURE FOR MILK CAN TOPS.
APPLICATION FILED NOV. 16, 1920.
1,405,679.
Patented Feb. 7, 1922.
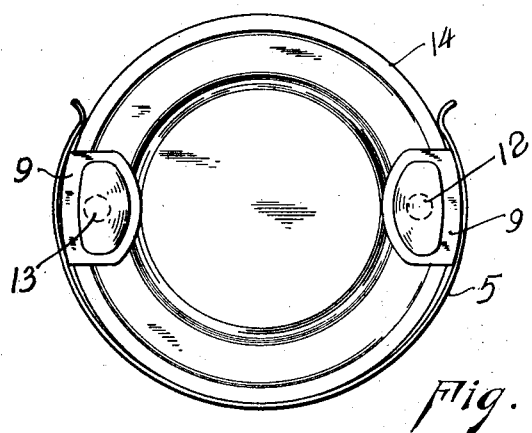
Fig. 1.
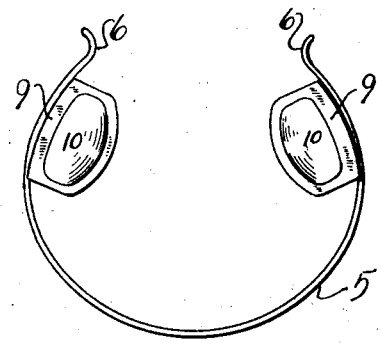
Fig. 2.
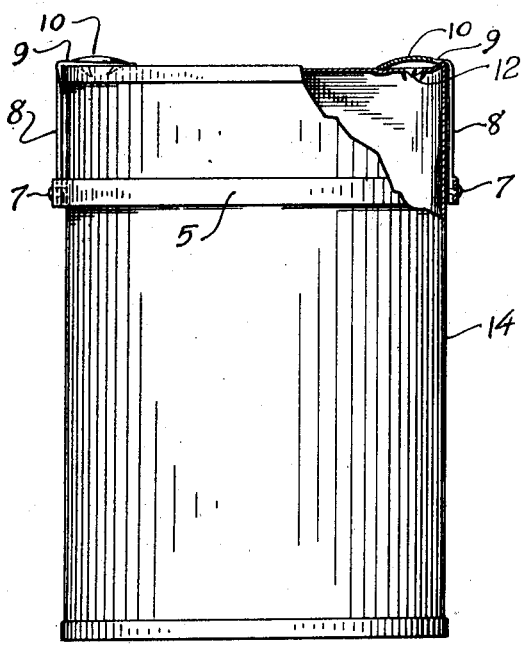
Fig. 3.
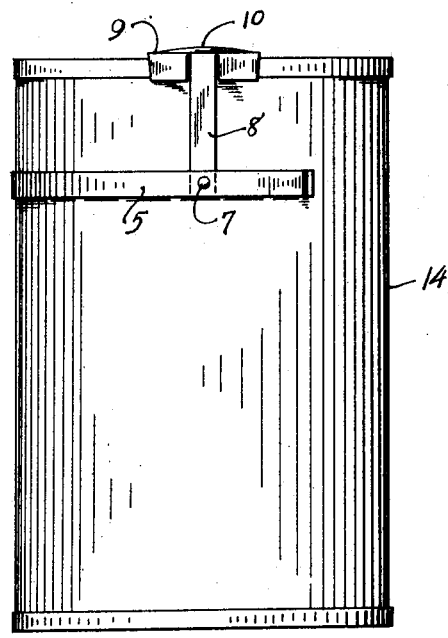
Fig. 4.
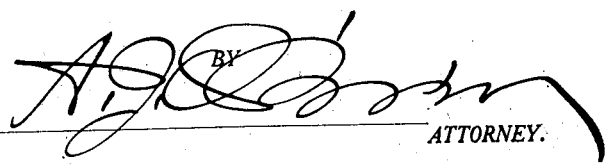
Mary C. Flannery, INVENTOR.
BY
ATTORNEY.

UNITED STATES PATENT OFFICE.

MARY C. FLANNERY, OF DENVER, COLORADO.

SANITARY CLOSURE FOR MILK-CAN TOPS.

1,405,679.  Specification of Letters Patent.  Patented Feb. 7, 1922.

Application filed November 16, 1920. Serial No. 424,370.

*To all whom it may concern:*

Be it known that I, MARY C. FLANNERY, a citizen of the United States, residing at the city and county of Denver and State of Colorado, have invented certain new and useful Improvements in Sanitary Closures for Milk-Can Tops; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in closures for the tops of cans containing condensed or evaporated milk. As is well known, these cans are normally tightly closed, and in order to use the milk, it is necessary to make two perforations, preferably diametrically disposed, one of which perforations is for venting purposes, while the other is to permit the escape of the milk as it is required. These cans contain such a quantity of milk that the entire contents are scarcely ever poured out at one time. In other words, the milk is used from the can intermittently as may be required. This makes it important that the vent and escape perforations should be closed when the can is not in use; otherwise insects and even flies are free to enter the can, thus spoiling its contents. Furthermore, dirt of various kinds is also free to enter the can in the absence of a suitable closure for these perforations.

My object is to overcome this difficulty, and to this end I have provided a simple and economical device adapted to be readily applied and easily removed from any milk can, the same being of such construction that both of the aforesaid ports may be kept closed to such an extent, at least, as to prevent the entrance of insects and dirt. More specifically speaking, the device consists, in its preferable form, of a spring band forming a clasp adapted to closely engage the milk can near the top. Mounted on this spring clasp are two arms at whose upper extremities small plates are located, which engage the top of the can and are adapted to close the said ports. The clasp is readily adjustable circumferentially on the can, whereby the two closure plates may be quickly adjusted or positioned so that they may close the said ports or expose them, depending upon whether the can is in use for milk removing purposes or not.

Having briefly outlined my improvement, I will proceed to describe the same in detail, reference being made to the accompanying drawing in which is illustrated an embodiment thereof. In this drawing:

Figure 1 is a top plan view of a milk can equipped with my improvement, the closure plates being shown in position to close the vent and exit or escape ports of the can;

Figure 2 is a top plan view of the sanitary closure shown in detail and as it appears when removed from the can;

Figure 3 is a side elevation of a milk can partially in section, the same also being equipped with my improvement; and Figure 4 is a similar view of a can, but illustrating the sanitary closure in a different position.

The same reference characters indicate the same parts in all the views.

Let the numeral 5 designate a spring clasp whose extremities 6 are curved slightly outwardly to facilitate the applying of the clasp to a can. A short distance from the extremities 6 of this clasp are secured, in any suitable manner, as by rivets 7, two upright arms 8 to whose upper extremities are secured small closure plates 9, whose central portions 10 are slightly convexed exteriorly, forming a diminutive chamber between the closure plate and the top of the can when the device is applied to the can. The surrounding edge of each plate, however, is adapted to engage the can or approach the same so closely as to prevent the entrance of insects or dirt of any character. I have found by experience that it is not best to close the perforations to such an extent as to make the can absolutely air tight when the closure plates are in position for closing these perforations. This is the reason for the convex conformation of the plates. While the edges of these plates engage the can in a reasonably close or tight relation, it will be understood that they are not sufficiently tight to prevent the entrance of air to the can, while they are sufficiently tight to prevent the entrance of dirt or insects.

It will be noted by reference to Figure 2 that when the clasp is removed from the can, the curved extremities 6 approach each other by virtue of the recoil of the spring clasp, so that the sanitary closure plates do not occupy positions diametrically opposite each other. When, however, the clasp is expanded, as is required in order to apply it to the can, which I will designate by the numeral 14, the closure plates are approximately diametrically positioned on the top of the can, as this is the preferable position of the two ports which I will designate by the numerals 12 and 13. It is evident that either of these ports may be employed as the outlet, and the other as the vent port.

Assuming that the device is in position on the can, as shown in Figure 1, it is evident that by slightly moving the clasp circumferentially on the can, the two ports 12 and 13 will be exposed, thus permitting the ready pouring of the milk from one of these ports as the air enters the other port. It is also evident that after the can is empty, and there is no longer further use for the sanitary closure device, the latter may be readily removed from the empty can and applied to another can. As there is practically no wear on the device, it is evident that one of these devices may be used for an indefinite length of time and in connection with a great many cans.

While it is evident that the arms 8 may be secured to the spring clasp in any suitable manner, it is preferred to rivet them tightly thereto, so that the closure devices will maintain their proper relative positions even when the clasp is removed from the can.

As shown in the drawing, the arms 8 are formed integral with the closure plates 9, but it is evident that the construction may be otherwise if desired, the only desideratum being that the closure device shall be properly constructed and positioned on the clasp to perform the aforesaid function.

Attention is called to the fact that the closure plates 10 are preferably formed of aluminum or other metal or material that will not readily corrode.

I claim:

1. A closure for milk cans comprising a spring clasp adapted to engage the sides of the can, and a pair of overhanging, opposed closure plates carried by opposed portions of the clasp to cover openings in the top of the can.

2. A closure for milk cans comprising a spring clasp adapted to engage the side of a can, and a pair of overhanging, opposed closure plates carried by opposed portions of the clasp to cover openings in the top of the can, said plates being carried by arms extending upward from said opposed clasp portions.

3. A closure for milk cans comprising a spring clasp adapted to engage the side of a can, and a pair of overhanging, opposed closure plates carried by opposed portions of the clasp to cover openings in the top of the can, each plate being concave on its under side and adapted to have its edges engage the surface of the can top.

In testimony whereof I affix my signature.

Mrs. MARY C. FLANNERY.